Figure 1:
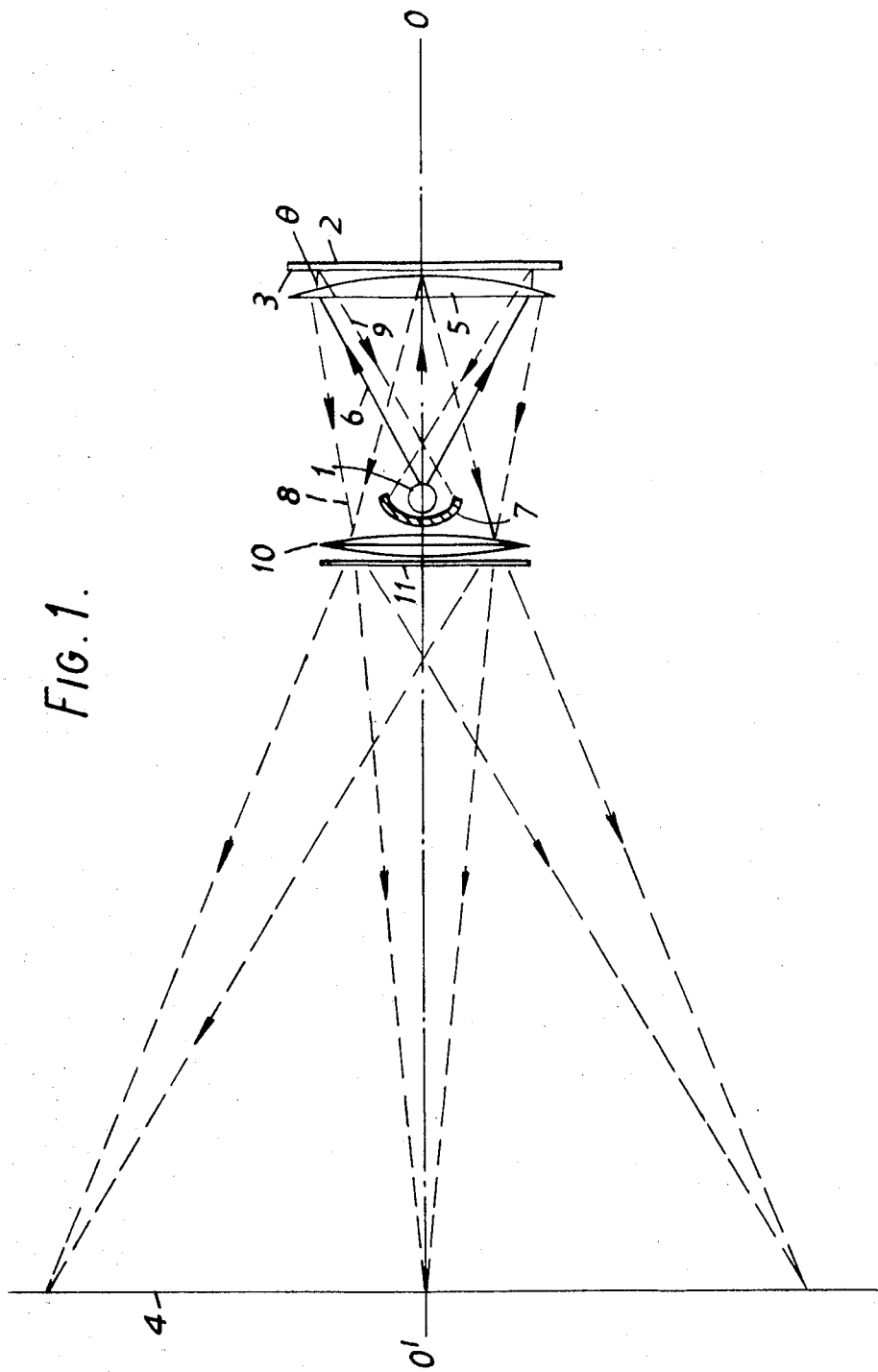

United States Patent [19]
Lissberger

[11] 3,730,610
[45] May 1, 1973

[54] DIRECTION-SENSITIVE PROJECTION SYSTEMS FOR LIGHT-DIFFRACTION GRATINGS

[75] Inventor: Paul Hans Lissberger, Altringham, England

[73] Assignee: Plessey Handel Und Investments A.G., Zug, Switzerland

[22] Filed: Nov. 5, 1971

[21] Appl. No.: 196,068

[30] Foreign Application Priority Data

Dec. 24, 1970 Great Britain.....................61,346/70

[52] U.S. Cl. ................350/162 SF, 350/206, 353/20
[51] Int. Cl. .............................................G02b 27/38
[58] Field of Search .................................350/162 SF

[56] References Cited

UNITED STATES PATENTS 3,504,606  4/1970  Macovski .................350/162 SF UX
3,093,705  6/1963  Glenn .......................350/162 SF UX Primary Examiner—John K. Corbin
Attorney—Alex Friedman et al.

[57] ABSTRACT

To produce on a screen an image of a diffraction grating pattern provided on a surface in which grating portions extending in one direction are represented bright and grating portions extending at right angles thereto are represented dark, the grating pattern is illuminated by a tubular lamp extending in the direction of the first mentioned grating portions through an autocollimator lens, the direct-reflected rays being intercepted by a lamp shield while the light diffracted by grating portions extending in the first-mentioned direction bypasses the shield to reach a projection lens to form a projected image on the screen, a lens mask being provided which intercepts light deflected in the longitudinal direction of the lamp.

6 Claims, 3 Drawing Figures

DIRECTION-SENSITIVE PROJECTION SYSTEMS FOR LIGHT-DIFFRACTION GRATINGS

This invention relates to the optical projection into a second plane of a light-diffraction grating arranged in a first plane, and it has for an object to provide a projected image in which portions of the grating extending in one direction of the first plane are reproduced in the projected image as bright areas and grating portions extending in the first plane at right angles to the first mentioned portions are represented as dark areas. The provision of such a system is desirable, for example, in connection with image generation by electromagnetic means, for example with images generated in the manner described in U.S. Pat. specification No. 3,347,614, but in its general form the invention is in no way limited to its combination with diffraction gratings produced in this manner. It is an object of the invention to provide an improved projection system for light reflecting diffracting gratings which permits effective utilization of a linear light source such as a fluorescent tube. Another object is to provide such a projection system which is of simple construction and which is economical in the number of lenses needed.

According to the invention the projection system comprises, aligned along an axis perpendicular to the said first plane, in which the grating system to be projected is arranged: a linear light source intersecting said axis at right angles; a collimator lens arranged between the light source and said first plane and operative so to divert rays of light coming from the point of intersection of the light source and said axis so as to strike said first plane in a direction parallel to said axis and vice versa, the diameter of said lens being sufficiently large and its distance from said first plane being sufficiently small to ensure the passage through said lens not only of all rays of light extending from a point of the area to be projected which extend parallel to the axis but also of substantially all the light extending from any such point in a direction inclined to such axis in accordance with the first lobe of the diffracted light, at least in one direction perpendicular to the said axis and coinciding with such direction of small dimension of the source of light so as to enable the said collimator lens to so direct light thus diverted by such diffraction as to pass along a path clear of said source of light, at least in said one transverse direction; a projection lens arranged at a distance from said first plane beyond the source of light to form, in a second plane arranged beyond the projection lens, a projected image of such point of diffracted reflection; a shield element interposed between the source of light and the projection lens and operative to prevent rays of light that after reflection from the first plane in a direction parallel to said axis, pass back through the collimator lens, from reaching the projection lens; and a lens stop arranged at a point adjacent to the projection lens and so constructed as to limit, for at least one color of light the transmission of light to the projected image to light substantially in a plane which is parallel to a plane containing the said axis and extending in a direction in which the dimension of the light source is small.

It is considered to be a considerable advantage of the present invention that it is not necessary for the light source to be of small dimensions in all directions but that on the contrary a light source having considerable length in a direction perpendicular to both the axis of the optical system and to said direction of small dimensions may be employed, thus permitting the use of discharge tube lamps, for example of mercury-halide lamps of the kind commonly used for street lighting.

Figure 2:
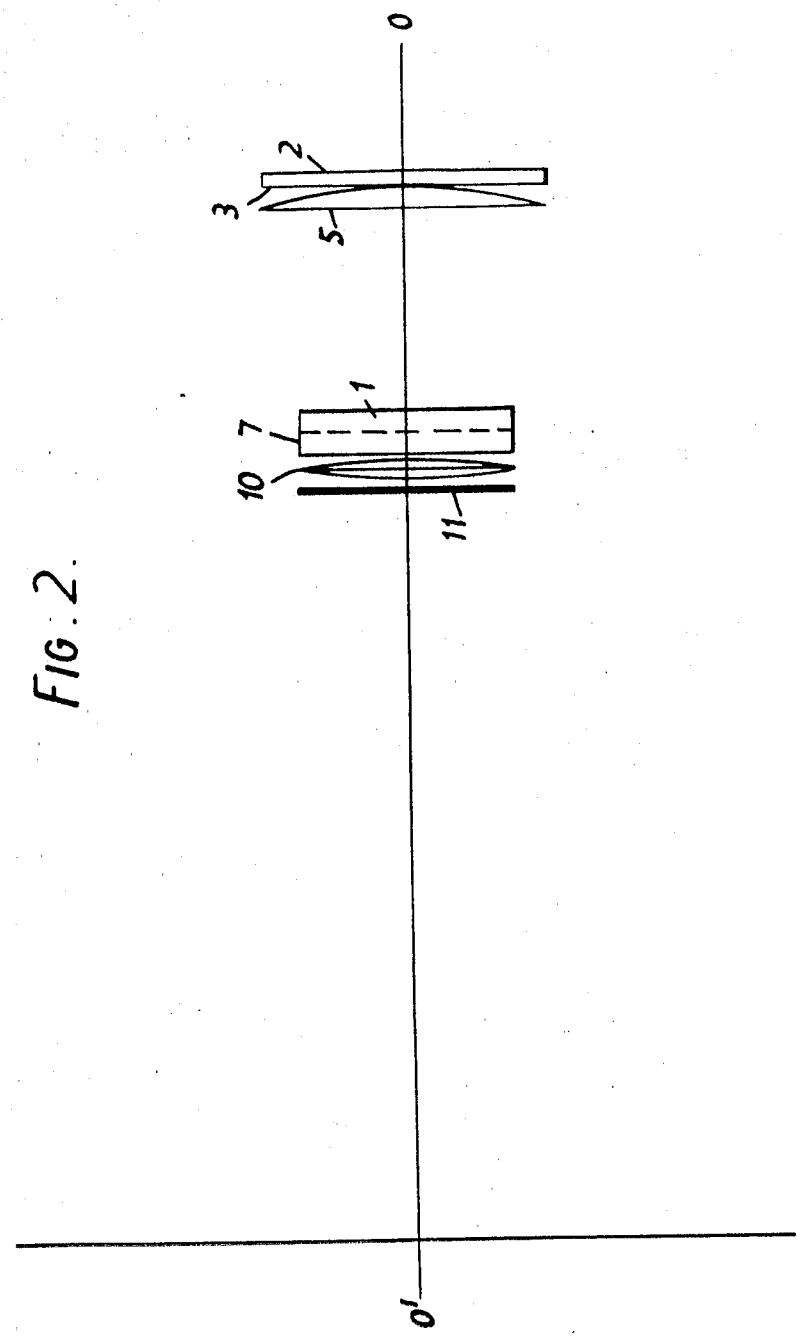
Figure 3:
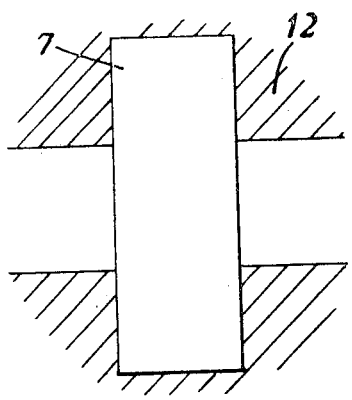

In order that the invention may be more readily understood, one embodiment will now be described in more detail with reference to the accompanying drawing, in which FIG. 1 is a diagrammatic plan view of an optical system suitable for illuminating a reflection-type diffraction grating system or its equivalent arranged in a first plane, automatically separating the direct-reflected light from the diffracted light issuing from the diffraction grating or equivalent, and projecting on to a screen in a second plane an image formed by the diffracted light;

FIG. 2 is a corresponding side elevation;

and FIG. 3 is an end view from the screen end of the axis, and

Referring now first to the drawings, a tubular lamp 1, which may be a mercury-halide lamp of the kind widely used for street lighting, is arranged to extend across an optical axis 0–0', along which all the elements of the system are aligned, each symmetrically to at least one plane containing the axis. This tubular lamp, whose longitudinal axis extends at right angles to the plane of FIG. 1, serves to illuminate a plane diffraction-grating pattern 3 provided in a first plane on a supporting surface 2. Interposed between the lamp 1 and the surface 2 is a collimator lens 5 which so deflects all rays of light coming from the point of intersection of the axis of the light tube 1 and the optical axis 0–0' that the deflected rays will strike the supporting surface 2 at right angles. Those rays which strike a portion of that surface that is of a plain reflecting character, are reflected back in their own direction and are therefore returned by the collimator lens to the source of light, and as far as the projection in the plane of FIG. 1 is concerned, this feature also applies to all rays of light coming from points along the axis of the light tube 1. In order to produce, by diffracted light from the grating pattern provided on the supporting surface 2, a projected image on a projection screen 4 in a second plane, a projection lens 10 is placed between the light source 1 and the screen 4, and a reflector 7, also acting as a light-and-heat shield, is interposed between the light source 1 and the lens 10 to prevent the access to the projection lens of direct light from the lamp and of non-diffracted light reflected back from the surface 2, through the lamp, and thus to prevent such light from interfering with the desired image formation by diffracted light.

Assuming now that parts of the supporting surface 2 are covered with diffraction-grating elements extending in a direction perpendicular to the plane of FIG. 1 or, in other words, parallel to the direction of the axis of the light source 1, any light from the source 1 striking the surface 2 at these parts will be diffracted within, or parallel to, the plane of FIG. 1, forming two first-order lobes, one at each side of each beam 6, each at an angle $\theta$, whose value depends on the wavelength of the light, to the direction, perpendicular to the supporting surface 2, to which the light from source 1 has been deflected by the collimator lens 5. The diameter of the collimator lens 5 is chosen sufficient in relation to the distance of the lens 5 from the supporting surface 2, to ensure that the light of both the first-order lobes of diffraction produced by the extreme rays 6 of light striking the pattern to be reproduced will pass through the lens 5. It will thus be appreciated that, provided that the width of the lamp-and-reflector assembly transversely to the axis of the lamp remains within the product of the effective distance $d$ between the axis of the lamp 1 and the supporting surface 2 multiplied by the angle $\theta$, the rays of light 8 and 9 corresponding to the first-order lobes of diffracted light will by-pass the lamp 1 and the reflector 7, and these rays will thus reach the projection lens 10 and form, on the projection screen 4 in the second plane, images of their points of origin in the first plane and that, provided the lamp aperture and the size of the projection lens 10 are appropriately chosen, the system is independent of wavelength.

Also interposed between the collimator lens 5 and the projection lens 10, and closely adjacent to the latter, is a lens mask 11 which prevents light from passing through the projection lens except in a narrow area extending transversely to the plane of the FIG. 1 and having a width not greater than that required for the passage of the light employed in forming the desired image of the requisite area of the support surface 2. This narrow area extends symmetrically to the plane of FIG. 1, across that diameter of the lens which lies in the plane of FIG. 1, and can be seen in FIG. 3, in which the areas blocked by the lens mask 11 are shown hatched at 12.

It will be readily appreciated that while the lens mask 11 will not interfere with the image formation by light returning from the supporting surface after being diffracted by grating portions extending in the direction at right angles to the plane of FIG. 1, light diffracted by grating portions extending parallel to the plane of FIG. 1 will be intercepted either by the lamp shield 7 or, if passing outside the latter, by the lens mask 11 areas of the surface 2 covered by grating portions parallel to the plane of FIG. 1 will therefore appear dark in the projected image similarly to areas at which no grating is provided.

It will also be appreciated that with this arrangement there is no need to limit the source of light to a point source but that, on the contrary, the length of the lamp is determined only by practical limitations of the dimension of the projection lens 10, there being no point in extending the length of the lamp beyond a value at which only little of the light from any additional length of the lamp would fall on to the area of the diffraction grating.

If, in using the apparatus, the diffraction grating is slowly rotated in its own plane from a direction at right angles to the plane of FIG. 1 to a direction parallel to that plane, the diffraction lobes will progressively move into the area blocked by the lens mask 11, thus progressively reducing the amount of light passing through the mask apertures, so that areas in which the diffraction grating extends in intermediate directions will progressively correspond to progressively lighter or darker half-tones compared with the extremes.

The system described with reference to FIGS. 1 to 3 may be modified in various details without departing from the scope of the invention. Thus the degree of magnification of the projected image may be varied by altering the optical characteristics and/or the disposition of the elements in a manner well known to those skilled in the art, and the system may be folded if desired by the introduction of a mirror in the path of light from the projection lens 10 to the screen 4. It is also possible to superimpose a second image upon the image produced by the system. Thus a semi-silvered mirror interposed between the projection lens and the screen may be employed for the superposition, on the screen 4, of an image from a second similar system or from another projector of any suitable kind.

What we claim is:

1. A projection system for light reflected by diffraction gratings arranged in an area of a first plane, which is sensitive to the direction of the gratings and comprises, along an axis perpendicular to said plane: a linear light source intersecting said axis at right angles; a collimator lens arranged closely adjacent to said plane between said plane and the light source with one of its focal points located in said linear light source, the diameter of the said lens being sufficient to accept substantially all the light of at least the first-order diffraction lobe produced by rays impinging perpendicularly on any grating in said area; a light shield at the opposite side of the light source and having, in a plane normal to said axis and including the light source, such a width as to intercept the undiffracted collimated light reflected by said area through the collimator lens while being bypassed by similarly reflected light of the first diffraction lobe; a projection lens arranged at said other side of the light source and arranged to form, in conjunction with said collimator lens, in a plane parallel to said first plane and situated beyond said projection lens at said other side of the light source, a projected image of said area.

2. A projection system as claimed in claim 1, which includes masking means intercepting light reflected from portions of said first plane situated outside said area in the longitudinal direction of the linear light source.

3. A system as claimed in claim 2, wherein said projection lens and masking means are located in close proximity to said light source.

4. A projection system as claimed in claim 1, wherein the light source is a tubular lamp.

5. A projection system as claimed in claim 1 wherein the light source is a tubular mercury-halide lamp.

6. A projection system as claimed in claim 1, wherein the light shield is combined with a reflector arranged to reflect light from the source to return along its line of arrival.

* * * * *